United States Patent [19]

Utter

[11] Patent Number: 5,471,534
[45] Date of Patent: Nov. 28, 1995

[54] DEVICES, SYSTEMS AND METHODS FOR COMPOSITE SIGNAL DECODING EMPLOYING INTERPOLATION FILTER

[75] Inventor: Mark E. Utter, Indianapolis, Ind.

[73] Assignee: Texas Instruments Incorporated, Dallas, Tex.

[21] Appl. No.: 127,209

[22] Filed: Sep. 27, 1993

[51] Int. Cl.$^6$ ..................................... H04N 7/04
[52] U.S. Cl. ..................................... 381/4; 381/5
[58] Field of Search .................. 381/4–6, 7, 15; 331/20, 25

[56] References Cited

U.S. PATENT DOCUMENTS

| | | | |
|---|---|---|---|
| 4,027,107 | 5/1977 | Eilers | 381/5 |
| 5,349,386 | 9/1994 | Borchardt et al. | 381/4 |
| 5,357,574 | 10/1994 | Whitecar | 381/15 |

*Primary Examiner*—Stephen Brinich
*Attorney, Agent, or Firm*—Robert D. Marshall, Jr.; James C. Kesterson; Richard L. Donaldson

[57] ABSTRACT

A device and method for composite signal decoding is provided in which an analog-to-digital converter (15) digitizes an incoming FM composite signal. The digitized signal is filtered by an interpolator (13) which uses filter coefficients developed as a function of a sampled pilot signal's phase without synchronizing the decoder sample rate to the pilot signal to reconstruct the composite signal at points Where the pilot signal phase is a multiple of 45°.

47 Claims, 4 Drawing Sheets

DEVICES, SYSTEMS AND METHODS FOR COMPOSITE SIGNAL DECODING EMPLOYING INTERPOLATION FILTER

CROSS REFERENCE TO RELATED APPLICATIONS

This application is related to the following pending or issued, co-assigned applications:

Ser. No. 07/739,130 (U.S. Pat. No. 5,239,585, TI-16093)
Ser. No. 938,114 (TI-16110), filed Aug. 31, 1992.

NOTICE (C) Copyright, Texas Instruments Incorporated, 1992. A portion of the Disclosure of this patent document contains material which is subject to copyright protection. The copyright owner has no objection to facsimile reproduction by anyone of the patent document or the patent disclosure, as it appears in the U.S. Patent and Trademark Office, patent file or records, but otherwise reserves all rights in its copyright whatsoever.

TECHNICAL FIELD OF THE INVENTION

This invention generally relates to devices, systems and methods for decoding a composite signal.

BACKGROUND OF THE INVENTION

In the prior art, various methods and systems have been developed to decode composite signals with varying degrees of success.

One such method of decoding involves first passing an analog composite stereo signal through a low pass filter to remove the subsidiary signals, such as the SCA signal, leaving only the basic stereo signal. The basic stereo signal is then mixed with the 38 KHz subcarrier with one resulting component being one sideband of the (L-R) signal translated down to baseband. The pre-mixing basic stereo signal and the stereo signal mixed with the stereo subcarrier are in parallel passed through a low pass filter and then to a summing circuit and a subtracting circuit, the summing circuit adding the two signals together and the subtracting circuit subtracting the mixed signal from the unaltered basic stereo signal. One of the resulting components from the summation is 2*l(t) (i.e. twice the time varying value of the left(t) channel component). As a result of the subtraction, one of the resulting components is 2*r(t) (i.e. twice the time varying value of the right channel component). The right and left channel information is then easily extracted by filtering out the remaining components resulting from the mixing, summation and subtraction operations. This analog approach is well known in the art and is susceptible to all of the disadvantages inherent with analog signal processing such, problems with noise, drift with temperature, and overall circuit complexity.

Another approach was digital decoding to overcome the disadvantages inherent with analog decoding circuitry. This method involves converting the composite FM stereo signal output from the FM discriminator to digital from analog. In this instance, the 38 KHz modulated portions of composite signal are sampled at selected points when the term [sin $2\Omega_p t$] (or alternatively sin $\Omega_{sc} t$, where $\Omega_{sc}$ is the angular frequency of the subcarrier, typically 38 KHz) in fm(t)= $[l(t)+r(t)]+A_p \sin(\Omega_p t)+[l(t)-r(t)]\sin(2\Omega_p t)$ where:

fm(t) is the time varying value of the composite signal;
l(t) is the time varying value of the left channel;
r(t) is the time varying value of the right channel;
$A_p$ is the amplitude of the pilot signal;
$\Omega_p$ is the pilot angular frequency ($2\pi F_p$), $\Omega_p t=\theta$ is the pilot's phase angle;
$F_p$ is the pilot frequency (19 KHz)

is equal to plus or minus one (the ninety degree points on the stereo subcarrier) such that the composite signal is equal to either twice the left channel (2l) or twice the right channel (2r), the left and right channel information can then be easily extracted. The substantial difficulty with this approach is that, if the samples vary from the ninety degree points on the subcarrier, the sine of the subcarrier signal will not equal plus or minus one and a given sample will not represent a signal which is essentially purely right channel information or purely left channel information; the result is a deterioration in channel separation. One means of overcoming this problem is to use a voltage controlled oscillator feedback path to phase lock the sampling frequency to the pilot signal frequency. The 19 KHz pilot signal is then used to determine when sampling of the 38 KHz modulated information will occur. This method however requires substantially complex and costly hardware to implement.

Thus, the need has arisen for improved devices, systems and methods for decoding composite signals. Such devices, systems and methods would overcome the substantial technical disadvantages inherent with currently available analog decoding means and the substantial cost and complexity disadvantages inherent with currently available digital decoding means.

Furthermore, a need has arisen to obtain a solution which avoids expensive phase locked loop circuitry and associated oscillators for decoding the left and right stereo channel signals.

SUMMARY OF THE INVENTION

In accordance with the teachings of the present invention, an FM stereo decoder is provided which substantially eliminates or reduces disadvantages or problems associated with prior art decoders. In particular, a digital decoder is provided for decoding a composite signal synchronized with a pilot signal. The decoder includes a filter for identifying specified channels. Filter coefficients for the filter are developed as a function of the pilot signal.

BRIEF DESCRIPTION OF THE DRAWINGS

For a more complete understanding of the present invention and the advantages thereof, reference is now made to the following descriptions taken in conjunction with the accompanying drawings, in which:

FIG. 4 is a pilot signal trace in the complex frequency plane;

DETAILED DESCRIPTION OF THE INVENTION

Figure 1:
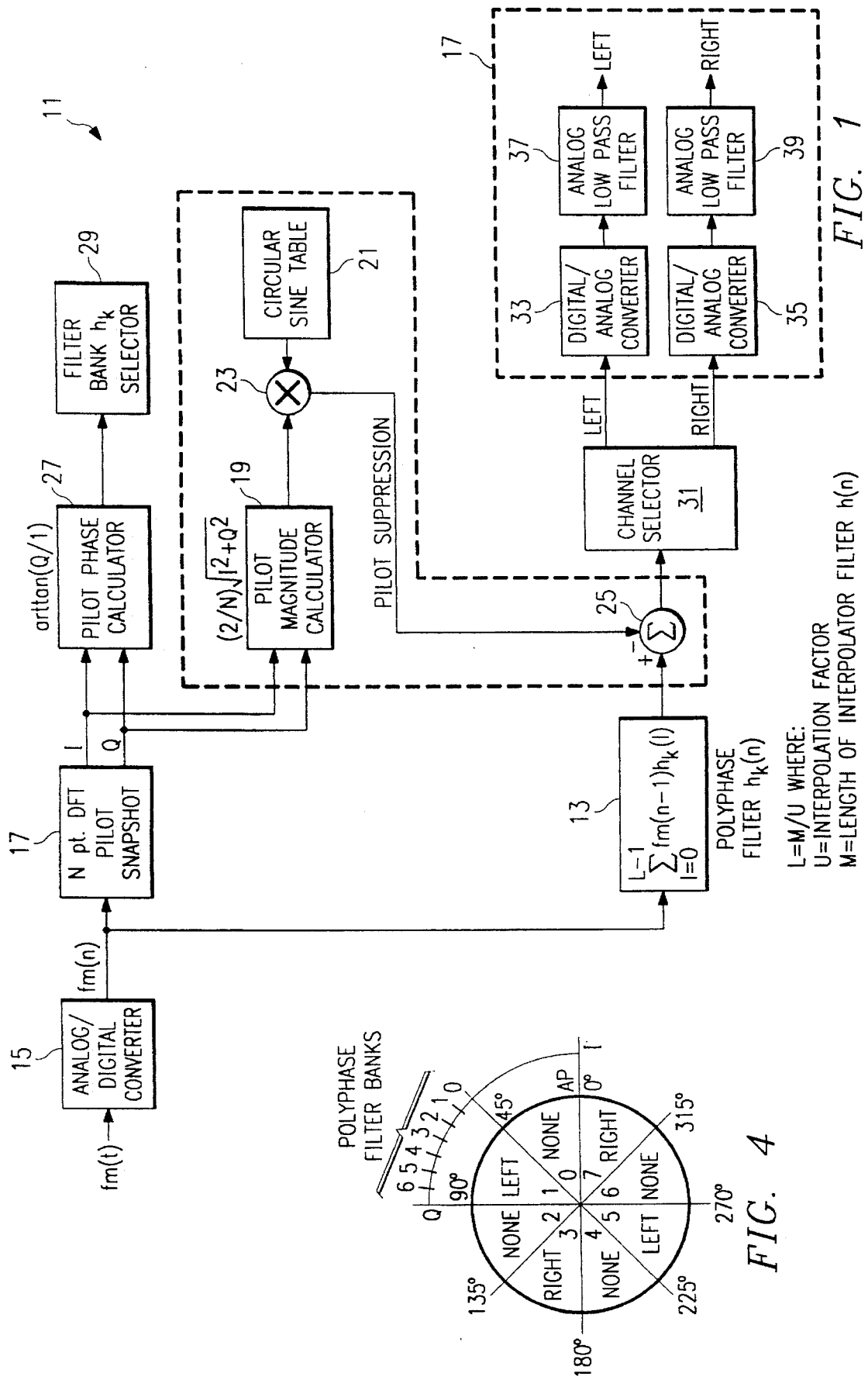
FIG. 1 is a block diagram of a digital decoder system according to the present invention.

Referring to FIG. 1, the preferred embodiment of the present invention is shown and depicted as a digital decoder 11 for decoding a digital composite signal. The composite signal includes a pilot signal and dual channels, such as that previously described in the background, in analog form.

The decoder 11 includes a filter 13 for filtering the channels from the composite signal. The filter 13 includes filter coefficients which are developed as a function of the pilot signal (19 KHz) without requiring synchronizing of the digital sampling rate (152 KHz) to the pilot signal. The filter 13 is designed as an interpolator for constructively determining a value of the composite signal during a given sample interval and at such instances as the phase of the pilot signal obtains an integral multiple of a 45° angle.

The sample rate and sample interval is described by an analog-to-digital converter 15 which may be included with the decoder 11 or attached externally thereto. Similarly a digital-to-analog converter system 40 may be externally attached to the decoder 11 or made a part thereof for converting the separated channels from digital-to-analog form.

The decoder 11 includes an upsampler for upsampling the composite signal by an interpolation factor. The interpolation factor is determined as a function of the channel separation which is commonly found to be 30 dB. The upsampler inserts a pre-determined number of zeros between samples of the composite signal. This pre-determined number of zeros is determined as a function of the interpolation factor. The interpolation factor is determined according to the following algorithms:

$$\frac{\phi}{360°} \cdot \frac{1}{f_c} = \frac{1}{f_{es}}$$

where $f_c$=carrier rate $f_{es}$=effective sample rate;

$\phi$ being determined according to the expression:

$1-\sin(90°+\phi)=10^{-\tau/20}$; and $U=\text{int}(f_{es}/F_s)$ where $\tau$ is desired channel separation in decibels;

U=interpolation factor;

$F_s$=sample rate; and int()=round-up operator to integer value.

The filter 13 comprises a lowpass filter with a passband corresponding to the bandwidth of the composite signal. The filter is a function of the effective sample rate and is designed to filter the composite signal according to the expression:

$$y(n) = \sum_{l=0}^{M-1} fm_u(n-l)h(l)$$

where $fm_u(k)=fm(k/U)$, $k=0, U, 2U, \ldots$ 0, all other cases fm=discrete composite signal;

h=filter coefficients; and

M=number of coefficients required to meet a pre-determined passband cutoff frequency, stopband cutoff frequency, and stopband attenuation.

Although the filter is designed according to the above expression, the filter 13 includes a sequence of subfilters where each subfilter is designed to correspond to a pre-determined offset from a 45° phase angle. Each of the filter coefficients of the subfilters are therefore factored by an interpolation factor. Thereby, a subfilter may be selected which corresponds with the offset of the phase of a sampled pilot signal within a selected sample of the composite signal from the 45° reference phase angle. Each of the subfilters are designed according to the expression:

$$y(n) = \sum_{l=0}^{L-1} fm(n-l)h_k(l)$$

where $h_k(l)=[h(k+Ul)] \cdot U$ $k=0, 1, 2, \ldots, U-1$;

U=interpolation factor;

L=number of filter coefficients within each said bank; and

L=M/U.

The decoder 11 includes an N point transformer 17 for generating a transformed signal from a sampled portion of the composite signal at the frequency of the pilot signal. The transformation results in a real and imaginary component of the sampled pilot signal.

The decoder includes a pilot signal suppressor for removing the pilot signal from the composite signal. The pilot signal suppressor includes a pilot magnitude calculator 19 for determining a magnitude of the pilot signal in a sampled portion of the composite signal, a reference circular sine table 21 for providing trigonometric sine values by using a circular lookup table containing uniformly spaced points along one cycle of a normalized sine wave and corresponding to the sampled pilot signal, a multiplier 23 for multiplying the pilot magnitude with the sine value to obtain a pilot suppression value, and a subtractor 25 for subtracting the pilot suppression value from either the sampled composite signal or the filtered composite signal. The pilot magnitude calculator 19 determines the magnitude of the pilot signal according to the equation:

$$A_p' = (2/N) \times \sqrt{I^2 + Q^2}$$

where $A_p'$=the magnitude, calculated $A_p$

I=the first complex component

Q=the second complex component;

the multiplier for multiplying the magnitude to the sine value and developing the pilot suppression signal.

Traditionally, an analog filter would filter out the pilot; however, digitally suppressing the pilot component will permit an analog filter with a more gradual roll off thus resulting in a simpler, less costly filter.

The decoder 11 includes a filter coefficient generator for generating the filter coefficients utilized by the filter as a function of the pilot signal. The coefficient generator includes a pilot phase calculator 27 for determining the phase of the sampled pilot signal and a filter coefficient bank selector 29 for storing and providing filter coefficients to the various subfilters as a function of the phase of the sampled pilot signal. The pilot phase calculator 27 determines the phase angle of the sampled pilot signal from the output of the transformer 17 according to the expression:

$$\theta' = \arctan(Q/I)$$

where $\theta'$=the phase angle, calculated $\theta$

Q=the first complex component

I=the second complex component.

The decoder includes a channel selector 31 for selecting the left and right channels from the filtered composite signal. The left and right channel signals connect to the digital-to-analog converter system 40 for converting the left and right channel signals into analog form.

The digital-to-analog system 40 includes a pair of digital-to-analog converters 33, 35 connecting respectively to the left and right channel output of the channel selector 31, and, lowpass filters 37, 39 respectively connected to the output of digital-to-analog converters 33, 35 for smoothing the analog signals of the left and right channels.

Figure 2:
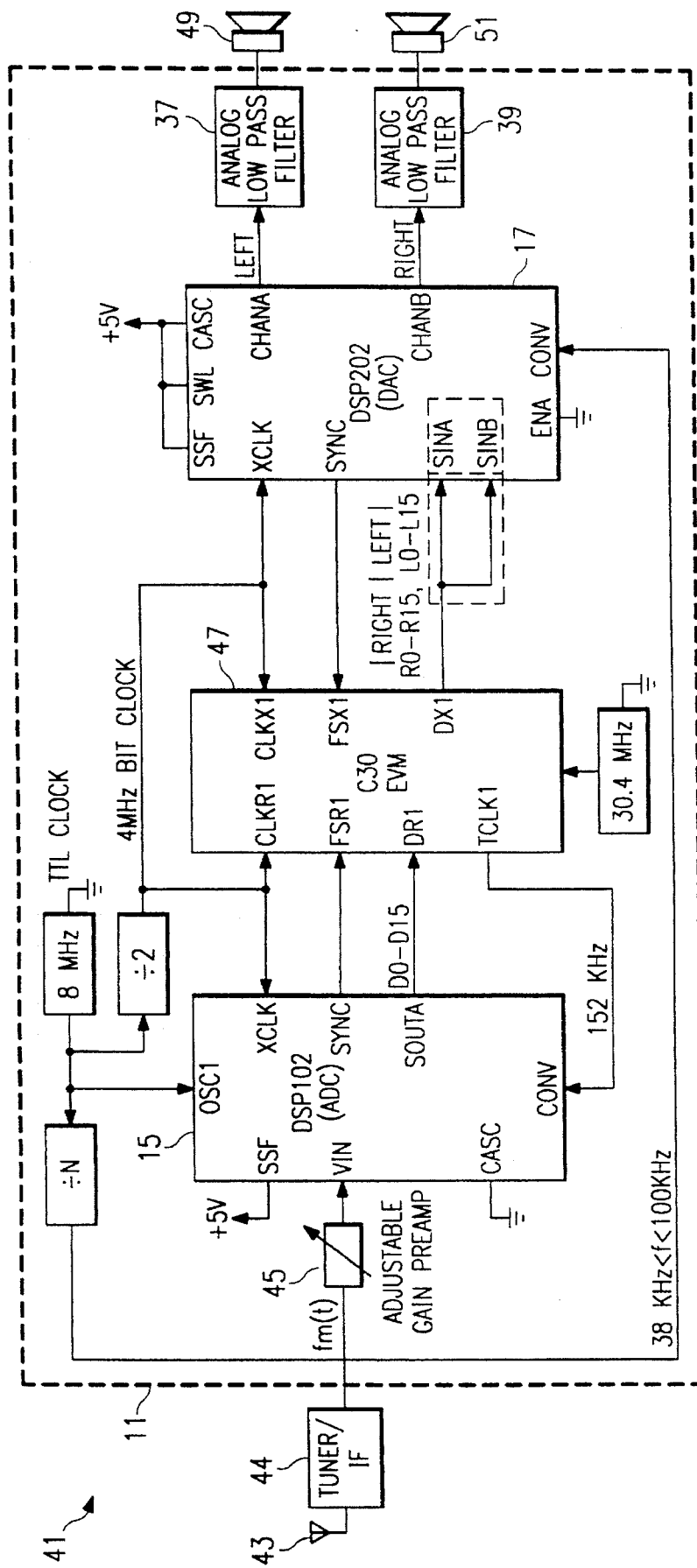
FIG. 2 is a hardware diagram of a digital decoder system according to the present invention.
Figure 3:
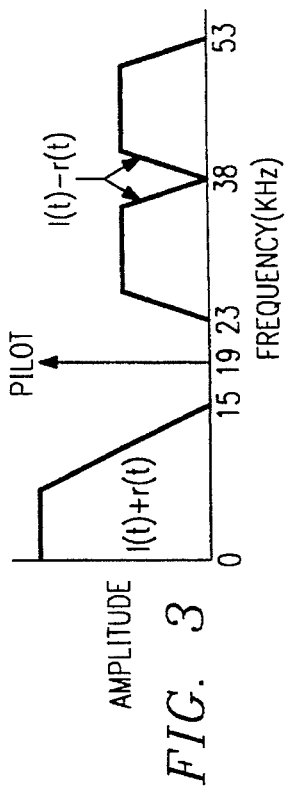
FIG. 3 is a frequency spectrum representative of a typical FM stereo composite signal.
Figure 6:
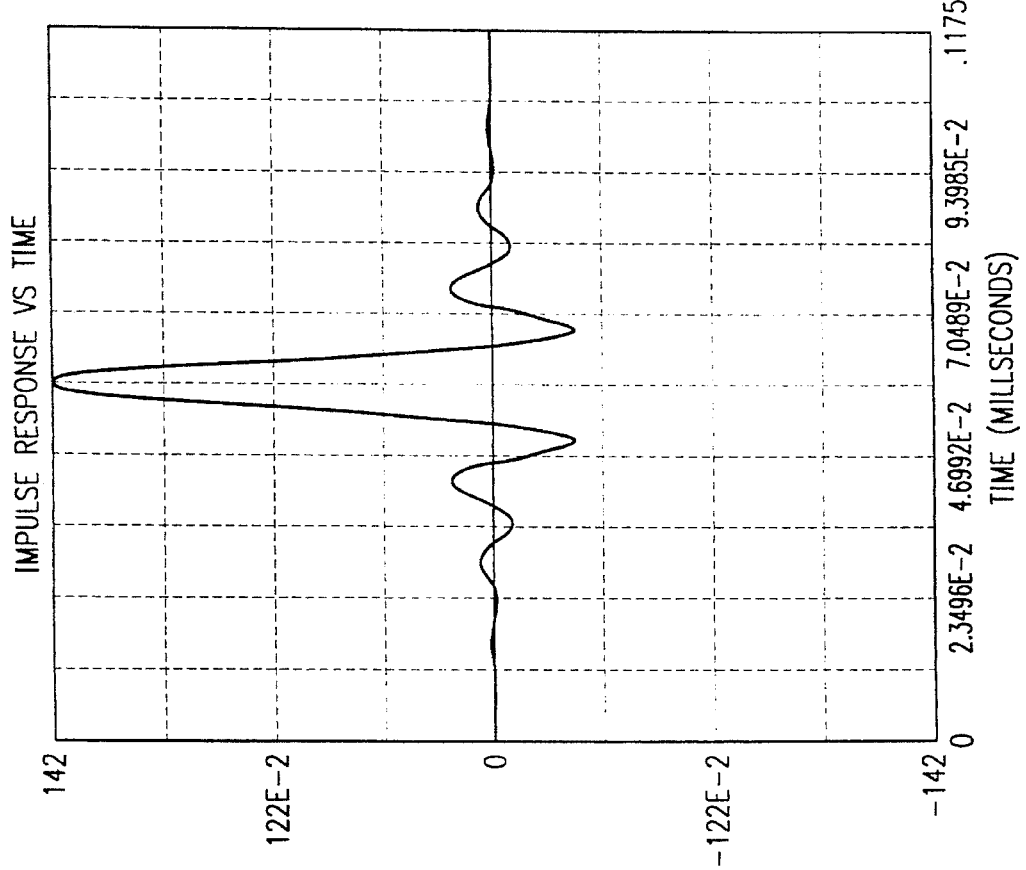
FIG. 6 is an impulse response curve for the lowpass filter.
Figure 5:
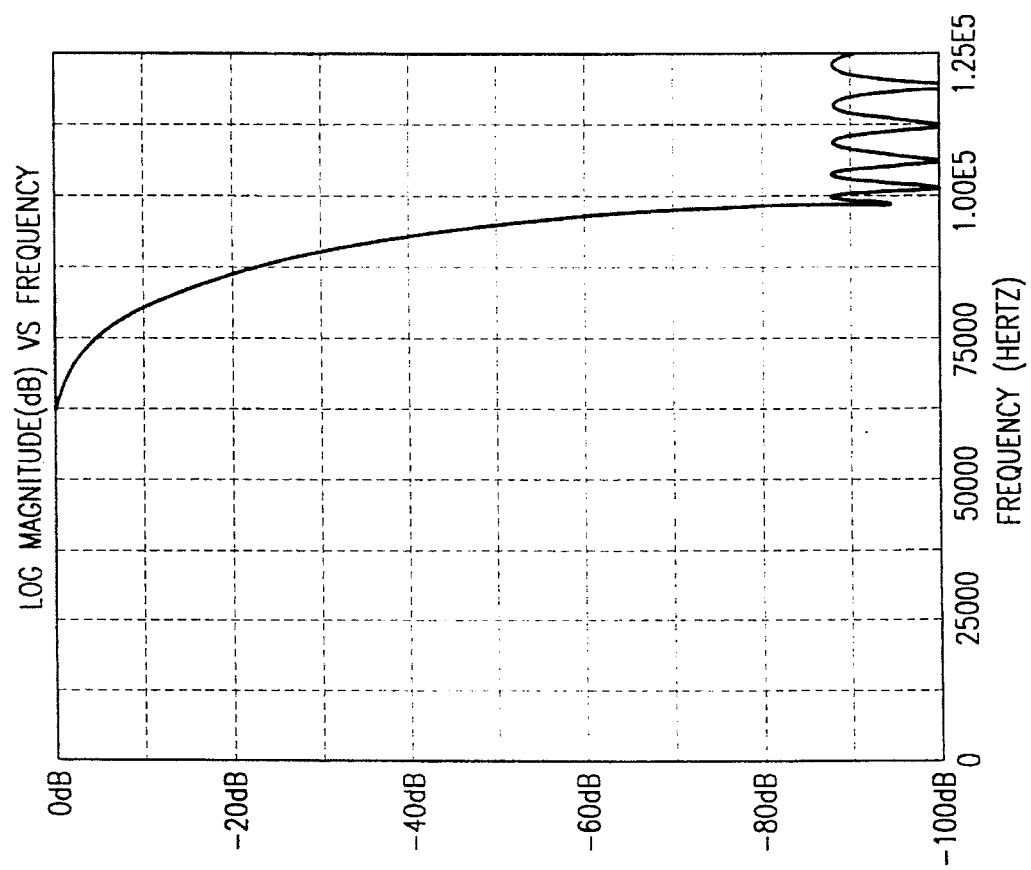
FIG. 5 is a gain curve for the lowpass filter.
Figure 7A:
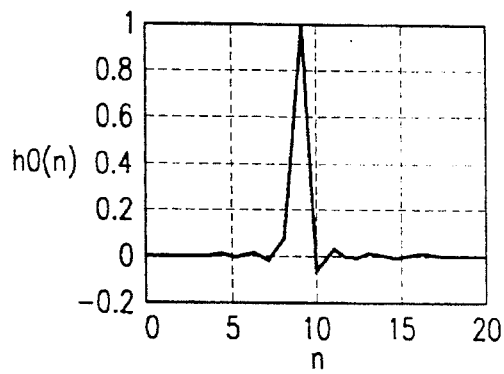
FIGS. 7 (a)–(g) are unit pulse responses for polyphase filter banks, $h_0(n)$ through $h_6(n)$.
Figure 7E:
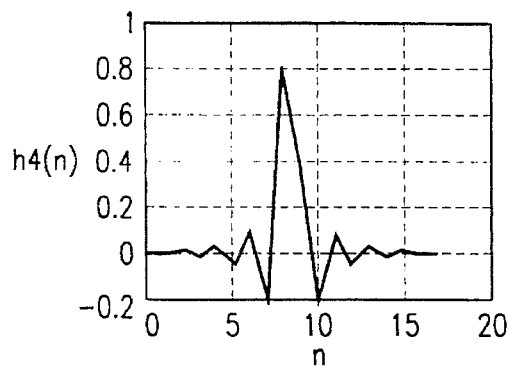
Figure 7B:
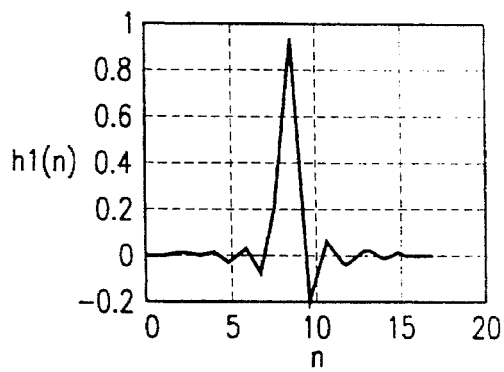
Figure 7F:
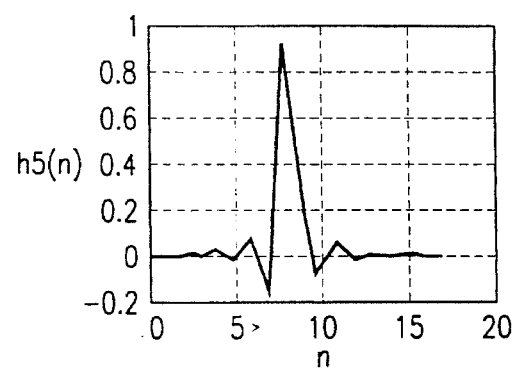
Figure 7C:
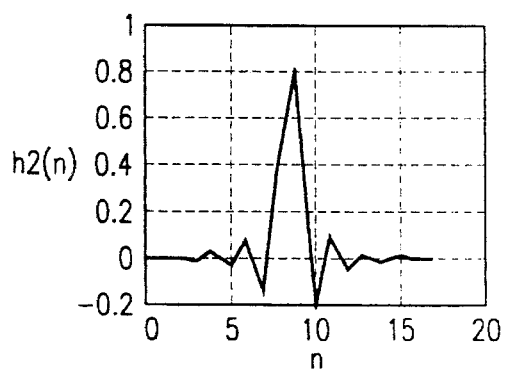
Figure 7G:
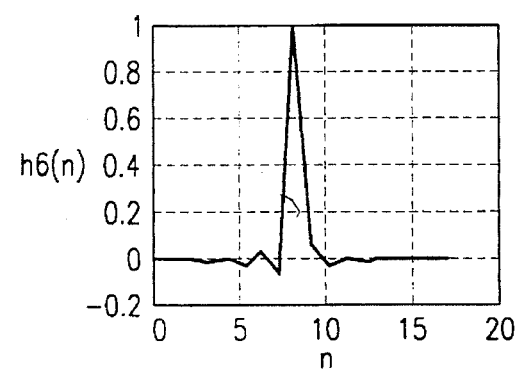
Figure 7D:
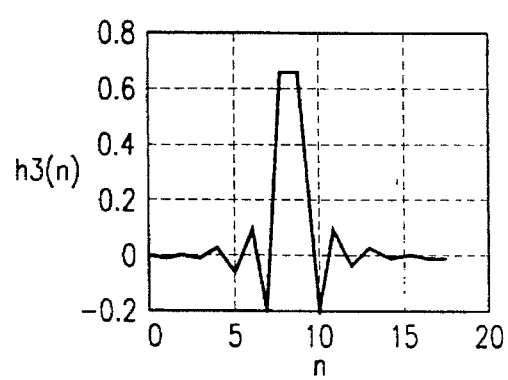

Referring to FIG. 2, a hardware implementation of an FM signal receiver 41 including a digital decoder 11 is shown. The receiver 41 includes an antenna 43 for receiving radio frequency broadcast carrying the composite FM signal to be decoded. A tuner/discriminator system 44 is coupled to antenna 43 in order to select a frequency band of the desired station while rejecting all other frequencies, downconvert the frequency of the selected band from the radio frequency to an intermediate frequency band, and extract the encoded signal with a spectrum as shown in FIG. 3 by stripping away the carrier. An adjustable gain pre-amp 45 connects to the output of tuner/discriminator system 44 for amplifying the output signal. The output of pre-amp 45 connects to an analog-to-digital converter 15 which may be implemented in hardware with a BB DSP102 component. The digitized output from the analog-to-digital converter 15 connects to a digital signal processor 47. The digital signal processor 47 may be implemented with a TI TMS320C30 chip which implements the transformer 17 through to the subtractor 25 as shown in FIG. 1. The output from the digital signal processor 47 is received by the digital-to-analog converter system 40 which includes the channel selector 31 as implemented with the BB DSP202 component. The analog output from the digital-to-analog converter system 40 is output to the respective lowpass filters 37, 39 which in turn output the smoothed left and right channel signals to respective speakers 49, 51 or other output media.

Referring to FIG. 3, a composite FM Stereo signal is depicted of the form:

$$fm(t) = [l(t)+r(t)]A_p \sin(\Omega_p t) + [l(t)-r(t)]\sin(2\Omega_p t)$$

where:

fm(t) is the time varying value of the composite signal;

l(t) is the time varying value of the left channel signal;

r(t) is the time varying value of the right channel signal;

$A_p$ is the amplitude of the 19 Khz pilot signal;

$\Omega_p$ is the pilot frequency of $2\Pi*19K$ radians per second (19 Khz).

FIG. 3 illustrates a frequency spectrum of a typical FM stereo composite signal showing the components of Equation 1. The components include a sum of the left and right channel signals covering a 15 Khz bandwidth from DC to 15 KHz and the difference of the left and right channels modulated to and centered about a 38 Khz suppressed stereo subcarrier signal, with upper and lower sidebands spanning a 30 KHz bandwidth. Additionally the composite signal fm(t) signal includes a 19 KHz tone signal, commonly referred to as the pilot signal which is used as a reference signal for the radio receiver. The composite signal may also contain subsidiary signals in the 53 Khz to 75 KHz bandwidth, such as a subsidiary communication authorization (SCA) signal. These signals are excluded from FIG. 1 for clarity.

The composite signal fm(t) must be separated into left and right channels ("decoded") in order to reproduce the broadcast message in stereo. This requires extracting from the composite signal the values of the left channel and the right channel signals, l(t) and r(t) respectively of Equation 1 in isolation from the other components of the composite signal.

The sample rate, $F_s$, that is used in this implementation is 152 KHz. This rate is chosen since it is above the Nyquist rate (106 KHz) and it is an integer multiple of the pilot's frequency. There must be an integer number of cycles in the block of samples when calculating the DFT otherwise there will be aliasing noise introduce din the output of the DFT. Also since $F_s/F_p$ equals 8 which is a power of 2, it makes it easier to determine when to update right or left output.

An N point DFT is employed to determine the phase angle and magnitude of the pilot signal, therefore, the only DFT complex value of interest is the one at $F_p$=19 KHz. The formulas for an N point DFT at frequency $F_p$ is:

$$I = \sum_{n=0}^{N-1} fm(n) \cdot \cos(2\pi n F_p/F_s) = \sum_{n=0}^{N-1} fm(n) \cdot \cos(\pi n/4)$$

$$Q = \sum_{n=0}^{N-1} fm(n) \cdot \sin(2\pi n F_p/F_s) = \sum_{n=0}^{N-1} fm(n) \cdot \sin(\pi n/4)$$

$$A_p' = \left(\frac{2}{N}\right) \cdot \sqrt{I^2 + Q^2} =$$

calculated magnitude of pilot signal, $A_p$.

$\theta' = \angle$Pilot=arctan(Q/I)=calculated phase angle of pilot signal, $\theta$ where I and Q are the in-phase (real) and the quadrature (imaginary) components of the pilot respectively.

The size of the DFT, N, is chosen at 128 samples so that there is an integer number of pilot cycles in the block to prevent aliasing distortion. Also 128 samples is a large enough window so that there is sufficiently small sidelobe leakage in the transform. It is necessary to perform a DFT snapshot at a rate such that the pilot will not drift by more than 6.43° (45°/U) between snapshots. This angle is based off using an interpolation factor (U=7). The pilot signal's frequency may deviate by as much as 2 Hz, this corresponds to a phase drift rate of 720°/sec. At this rate it would take 8.93 msecs to drift 6.43°. At a sample rate of 152 KHz, this is equivalent to approximately 1357 signal samples. Therefore the DFT snapshot rate must be greater than 1 snapshot/1357 samples.

The twiddle factors used in calculating the DFT are determined by calculating the $\cos(\pi n/4)$ terms, letting n be integers in the range [0, ..., 7]. Therefore, only 8 cosine and 8 sine terms are necessary to compute the DFT. These terms are stored in two tables. It is assumed that between snapshots, the pilot is traversing 45° ($360°\cdot F_s/F_p$) every sample period. If the sample rate is not exactly 152 KHz an error will be produced. This error accumulates every sample input between DFT snapshots and must be added to the accumulated error associated with the pilot's frequency deviation. The total sum of these two errors must be less than 6.43° to maintain good channel separation.

The desired channel separation is −30 dB. This means if the left channel l(t) is set to zero and the right channel r(t) is set to one then 20 log(l$_r$(t)/r(t)=20 log(l$_r$(t))=−30 dB. The recovered left signal, l$_r$t(t), is equal to fm(t) evaluated at $\Omega_p t=45°$. Therefore, l$_r$(t)=1−sin(90°+φ)=10$^{-30/20}$. Solving for φ, we get φ=14.5°. Therefore, 14.5° of accuracy is required for 30 dB of channel separation. 14.5° results in 1.055 µs of processing time for a 38 KHz signal (the DSB suppressed carrier frequency) by the equation:

$$\frac{14.5°}{360°} \cdot \frac{1}{38\text{KHz}} = 1.055 \text{ µs}$$

1.055 µs of processing time corresponds to a frequency of 947.5 KHz. In order to have an effective sample rate of 947.5 KHz, a 6.2:1 interpolation factor is required. An integer factor is necessary, therefore, 7:1 interpolation factor is used. This means that the input composite signal must be upsampled by a factor of U=7. This is accomplished by inserting 6 zeros between each input sample. This produces an effective sample rate of 1064 KHz. If better than 30 dB of separation is desired then the composite signal should be upsampled by a factor greater than 7. Using the interpolation factor of 7 requires that the phase calculation needs to be accurate within 6.4° (45°/7) of the actual pilot's phase.

The filtering is accomplished using a low pass Parks-McClellan (PM) equiripple FIR filter 13 having unity DC gain and a passband cutoff frequency at 53 KHz and a stopband cutoff frequency at 99 KHz. The passband and stopband ripple is less than 1 part in 4096 (0.000244). The filter 13 is designed using the effective sample rate of 1064 KHz. The filter coefficients h(l), were calculated using the filter design package. The filter 13 has M=126 taps or coefficients which meets all of the above criteria. The filter equation is:

$$y(n) = \sum_{l=0}^{M-1} fm_u(n-l) \cdot h(l) \text{ where } M = L \cdot U$$

fm$_u$(k)=fm (k/U) k=0, U, 2U, . . . 0 otherwise

Since there are U−1 zeros (which in the example case is 6 zeros) between each pair of samples in the upsampled signal, fm$_u$(n), there is no need to perform a sum of all 126 products since there will only be 18 nonzero products. Each filter coefficient is first multiplied by U to preserve unity DC gain and then grouped into U banks, each containing L=18 coefficients. Now the filter can be thought of as U subfilters each having only 18 taps. These subfilters are commonly referred to as polyphase filters. Only the 18 most recent composite signal samples need to be stored in a circular buffer. The bank chosen for filtering depends on how many integer multiples of 6.43° the pilot is offset from a desired pilot angle (45°, 135°, 225°, or 315°). The same filter bank is used for all right and left outputs until the next DFT snapshot is performed at which time another filter bank may be selected. The filter equations for each polyphase filter is shown below:

$$y(n) = \sum_{l=0}^{L-1} fm(n-l) \cdot h_k(l)$$

h$_k$(l)=h(k+Ul).U k=0, 1, 2, . . . , U−1; l=0, 1, 2, . . . L−1

FIG. 4 shows the region in the complex plane which the pilot signal traverses and how the polyphase filter banks are associated with the pilot's phase angle. The FIG. 4 also shows the octants of the circular trace in which the right and left signals are output. The interpolator filter's unit pulse response can be represented as h(n):

h(n) = [h(0), h(1), h(2), . . . , h(125)]; U = 7

Polyphase Filters:

Angle Offset Range (a = 6.43°)

Bank 0: h$_0$(n) = U · [h(0), h(7), h(14), . . . , (h(119)]
[0,a)

Bank 1: h$_1$(n) = U · [h(1), h(8), h(15), . . . , (h(120)]
[a,2a)

Bank 2: h$_2$(n) = U · [h(2), h(9), h(16), . . . , (h(121)]
[2a,3a)

Bank 3: h$_3$(n) = U · [h(3), h(10), h(17), . . . , (h(122))]
[3a,4a)

Bank 4: h$_4$(n) = U · [h(4), h(11), h(18), . . . , (h(123)]
[4a,5a)

Bank 5: h$_5$(n) = U · [h(5), h(12), h(19), . . . , (h(124)]
[5a,6a)

Bank 6: h$_6$(n) = U · [h(6), h(13), h(20), . . . , (h(125)]
[6a,7a)

The decoder 11 is implemented using a TMS320C30 digital signal processor Evaluation Module (EVM) 47 and a Burr Brown (BB) Analog I/O board (Model #ZPD1007). The EVM interfaces with the BB board via serial port 1. The BB board consists of the following features:

Two channel 16 or 18 bit, 200 KHz analog to digital (A/D) input (P/N #DSP102)

Two channel 16 or 18 bit, 500 KHz digital to analog (D/A) output (P/N #DSP202)

Selectable conversion rate and clock sources

User-configurable 6-pole analog low pass filters

Prototyping area for input or output signal conditioning

The BB DSP102 ADC 15 is configured in noncascaded 18 bit mode and the digital signal processor 47's serial receiver is programmed to receive 16 bits. The 2 least significant bits (LSBs) are ignored by the digital signal processor 47 since it is programmed to receive only 16 bits. The receiver's interrupt is enabled, therefore upon receiving 16 bits from the ADC 15 into the digital signal processor 47's DR1 input, an interrupt is generated and an interrupt service routine (ISR) is executed. The rate at which the interrupts occur is governed by the conversion clock which is set at 152 KHz. The conversion (CONV) input on the ADC is active low. The ADC shifts out the most significant bit (MSB) first. The bits are shifted out of the ADC on the rising edge of the external bit clock and into the serial receive shift register on the next rising edge of the bit clock. The bit clock's frequency is 4 MHz and is connected to the digital signal processor 47's CLKR1 input. The synchronization format is configured to be active high. The ADC 15 generates an active high synchronization pulse on the next rising edge of the bit clock when a conversion command is received. This signals the digital signal processor 47 that the next frame of serial data is going to begin on the next bit clock cycle. The prototype area on the BB board is used to connect an amplifier 45 with adjustable gain to the composite signal input. The gain is adjusted so that the input signal ranges from −2.75 to 2.75 volts to allow full scale range of the ADC 15 to be utilized. The EVM's TCLK1 timer output is used to generate the sample clock by using a 30.4 MHz oscillator in lieu of the 30 MHz one which is normally supplied with the EVM.

The BB DSP202 digital-to-analog convertor 40 is configured in 32 bit cascaded mode. The right and left audio outputs are each 16 bits. Both outputs are concatenated into one 32 bit word. The left audio output is contained in the most significant 16 bits and the right output is contained in the least significant 16 bits. The digital-to-analog converter 40 converts each 16 bit audio output to analog signals and provides separate output pins for both left and right analog audio signals. The serial transmit register is updated with the audio output word in the ISR. Each channel is updated at a 38 KHz rate, therefore the 32 bit output word is updated at a 76 KHz rate.

The rate at which conversions occur is governed by the conversion clock which can be set to any frequency from 38 KHz to 100 KHz (4 MHz/40). The conversion (CONV) input on the DAC is active low. The digital signal processor 47 shifts out the MSB first. The 32 bit frame of audio data is shifted out of the digital signal processor 47's transmit shift register on the rising edge of the external bit clock and into the digital-to-analog converter 40 on the next rising edge of the bit clock. The bit clock is the same as that used by the ADC 15 and is connected to the digital signal processor 47's CLKX1 input. The maximum bit clock rate that can be sued when using the 30.4 MHz oscillator for the digital signal processor 47 and an externally generated bit clock is 5.84 MHz (30.4 MHz/5.2). The synchronization format is configured to be active high. The digital-to-analog converter 40 generates an active high synchronization pulse on the next rising edge of the bit clock when a conversion command is received. This signals the digital signal processor 47 to transmit the next frame of data. Each of the DAC's analog outputs are connected to a 6 pole low pass analog filter which can be designed with an appropriate 3 dB audio cutoff frequency (e.g. 20 KHz).

The decoder software (Table 1) was written using C and assembly language for the TSM320C30. The main and serial port initialization routines were written in C. The C routines were compiled using the compiler's register model and optimizer options. These options allow faster execution of the main routine writing the main routine in C in lieu of assembly language greatly simplified the programming task. The main routine performs initialization and executes the executive loop. The executive loop performs the DFT pilot snapshot, calculates the pilot's phase angle by computing the arctan (Q/I), computes the pilot's magnitude, and updates the interrupt service routine (ISR) variables.

The ISR variables are updated together at one time in the critical code section once every loop or DFT snapshot. Just before the ISR variables are updated, interrupts are disabled. The interrupts are re-enabled after all ISR variables are updated. The time which the interrupts are disabled is kept short so as not to miss an incoming sample. The executive loop also ensures that the DFT buffer begins refilling on a modulo 8 sample. This forces the pilot cancellation table pointer to be pointing at the right value upon exiting the critical code section.

From the pilot's phase angle information, the appropriate polyphase filter bank is determined. There are 7 banks of filter coefficients, each bank containing 18 coefficients. When the DFT buffer is full with the next 128 composite signal samples, the next DFT snapshot is performed and the pilot's phase angle and magnitude is updated and a new filter bank is chosen.

The serial receive ISR is written in assembly language. This routine is written in assembly so that it is optimized for execution speed. The ISR makes good use of the programming features of the TMS320C30 digital signal processor such as circular addressing mode, zero overhead looping using the RPTS instruction and delayed branches. The composite signal is being sampled at 152 KHz, therefore the interrupts occur at this rate. Since the TMS320C30 digital signal processor EVM 47 uses a 30.4 MHz oscillator, this corresponds to 100 instruction cycles. The ISR must be executed in less than 100 cycles on average so that there is time remaining in between samples for the executive loop to do some processing. Also the ISR's execution time can never be greater than 200 cycles or else a sample will be missed.

The ADC's conversion clock which determines the sample rate (152 KHz) is controlled by an external clock source (TCLK1). The ISR reads the ADC's converted composite signal sample from the serial port 1 receive register and converts it to a floating point value. The left and right audio output values are sent out through serial port 1 transmitter to the DAC. The DFT buffer is also written to and when detected full, sets a flag to signal the executive loop to perform the next DFT snapshot. The executive loop clears this flag when the DFT snapshot is completed so that the ISR can begin to refill the DFT buffer with the next 128 samples. The ISR then determines if it is time to update the left or right channel and if so then the filtering is performed using the appropriate polyphase filter bank determined by the executive loop.

The pilot component is also digitally suppressed from the filtered output signal samples using the pilot's calculated magnitude and a table which contains 4 uniformly spaced values of one period of a normalized sinusoid. The 4 values are calculated from $\sin(n\pi/4)$ where $n=1, 3, 5$ and $7$. These 4 values are stored in a circular table so that the circular addressing mode can be used. The digital suppression works well if the pilot's magnitude remains fairly constant between DFT snapshots. The cutoff frequency of the analog low pass filters which is used to smooth the quantized outputs can be higher than 19 KHz since the pilot component is digitally suppressed from the outputs. The filtered result is then used to update the appropriate channel and the program exits the ISR and returns to the executive loop.

Although the present invention has been described in detail, it should be understood that various changes, substitutions and alterations can be made without departing from the spirit and scope of the invention as defined solely by the appended claims.

Table 1:

The C language function "main()" which contains the executive loop is shown below:

```c
#include "ports.h"
#include "defs.h"
#include "fmdecode.h"
#include "f:\dspfloat\math.h"
main()
{
register unsigned int i;
/*******************
   Initialization
*******************/
free_run_count=0;
count_offset=0;
count=0;       /* clear sample counter */
octant=0;      /* clear pilot phasor octant */
filt_bank=0;   /* clear filter bank index */
dft_flag=0;    /* clear DFT buffer full flag */
mag_X=1;       /* initialize pilot magnitude */
ports_init();
clear_ints();  /* reset all IF interrupt bits  */
rint1_enable(); /* enable serial receive interrupt */

/* Initialize DFT pointers to first location of buffer */
ptr_x= x;
dft_buf= x;
/* Initialize filter pointer to first location of buffer */
ptr_y= y;
/* Initialize filter coeff. ptr. */
filtaddr= (int)h;
/* Initialize pilot table pointer */
pilot_ptr= pilot_table;

gie_set();    /* set GIE bit to enable interrupts */

/**************************************
   Executive Loop
   (executed after every DFT snapshot)
**************************************/ while (TRUE)
{

/* Compute in phase and quadrature components of N point DFT at
   fixed freq Fp= Fs/8 where Fp is freq. of pilot, and Fs
   is sampling freq.*/
if (dft_flag==1)
{
ptr_x= x;  /* Reinitialize DFT pointer */
I=0;
Q=0;
for (i=0; i<N; i++)
{
/* Calculate in phase and quadrature components of
DFT snapshot */
I+= *ptr_x*cosine[i%8];
Q-= (*ptr_x)*sine[i%8];
ptr_x++;
}
/* Compute phase angle of pilot signal by finding the
arctan(Q/I). */
/* Phase angle of pilot in degrees [-180, 180] */
phase_X= (180/PI)*atan2(Q,I);
/* Compute magnitude of pilot signal */
mag_X= 2*sqrt(I*I + Q*Q)/N;
/* sector is float number in range [0,56) */
if (phase_X < 0)
   sector= (360.0+phase_X)/(PHASE_RES);
else
   sector= phase_X/(PHASE_RES);
/* Determine filter bank to use (filt_bank is integer in
range [0,6]) */
filt_bank= (int)sector % INTERP;  /* (int)sector is
integer in range [0,55] */
/* Determine the octant where pilot phasor is located
   (octant_main is integer in range 0 [0,7]) */
octant_main= (int)(sector/INTERP);
/* Update pilot correction table pointer */
pilot_start= pilot_table+ (int)(octant_main/2);

/* Update filter coeff. ptr */
filtaddr_main= (int)h+ filt_bank*18;

/* Make sure that DFT buffer refills starting with
modulo 8 sample */
while (dft_flag== 1)
{
/* Begin critical code section */
gie_clear();   /* clear GIE bit to disable interrupts */
if ((free_run_count & (BIT2 | BIT1 | BIT0))== 0)
   {
   dft_buf= x; /* Reinitialize DFT buffer pointer */
   dft_flag=0;  /* Clear DFT buffer full flag */
/* Update ISR variables */
   pilot_ptr= pilot_start;
   filtaddr= filtaddr_main;
   octant= octant_main;
   count= count_offset;
   }
gie_set();    /* set GIE bit to enable interrupts */
/* End critical code section */
}
}
}
}
```

The C language file "funcs.c" which contains function "ports_init()" that initializes serial port #1 , the primary bus control register, and timer #1 is shown below:

```c
#include "ports.h"
#include "defs.h"
#include "fmdecode.h"
/* This function initializes the primary bus control register, and
 serial port 1 */
void ports_init()
{
port= (unsigned int *)PRIM_BUS_CTL;
*port= 0;

/* Initialize serial port #1 */ port= (unsigned int *)SERIAL_XMIT_CTL1;
*port= (CLKXFUNC | DXFUNC | FSXFUNC);

port= (unsigned int *)SERIAL_RCVE_CTL1;
*port= (CLKRFUNC | DRFUNC | FSRFUNC);

port= (unsigned int *)SERIAL_GLOB_CTL1;
*port= (XLEN0 | XLEN1 | RLEN0 | RINT | XRESET
 | RRESET);

port= (unsigned int *)TIMR_PER1;
*port= TCLK1_PER;

port= (unsigned int *)TIMR_GLOB_CTL1;
*port= (FUNC | CLKSRC | GO | HLD);
}
```

The C language file "globals.c" which declares variable types and initializes the twiddle factors and the interpolation filter coefficients is shown below:

```c
#include "defs.h"
float I;  /* Real and imag parts of pilot signal*/
float Q;
asm("_y\t.usect \"filt_buf\",18");
extern float y[18];  /* Circular buffer for last 18 samples */
asm("_x\t.usect \"dft_buf\",128");
extern float x[N];  /* DFT Buffer N signal samps) */
float *ptr_x, *ptr_y, *dft_buf;
const float *pilot_ptr, *pilot_start;
float phase_X;  /* phase angle of pilot signal */
float mag_X;  /* magnitude of pilot signal */
float sector;
volatile unsigned int *port, free_run_count,
count_offset, dft_flag;
void ports_init();
int octant,filt_bank,filtaddr;
int octant_main,filtaddr_main;
unsigned int count;
```

```c
/* Twiddle Tables */
const float sine[]= {0.0, .707106781, 1.0,
 .707106781, 0.0, -.707106781,
           -1.0, -.707106781};
const float cosine[]= {1.0, .707106781, 0.0,
 -.707106781, -1.0, -.707106781,
           0.0, .707106781};
/* Polyphase filter coefficient */
const float h[7][18]={
/* Taps for 0 pt. stage*/
/* h0 */
-0.00011426 ,-4.11365e-006 ,0.000176379 ,
-0.000769295 ,0.00226274 ,
-0.00547454 ,0.0119559 ,-0.0257936 ,
0.0676469 ,0.997106 ,-0.0680094 ,
0.0324999 ,-0.0182279 ,0.0102127 ,
-0.00535979 ,0.00251081 ,-0.000988085 ,
0.000290436 , /* Taps for 1 pt. stage*/
/* h1 */
8.56598e-005,-0.000456579,0.00172808 ,
-0.00480929 ,0.0111744 ,-0.0231834 ,
0.045421 ,-0.0912276 ,0.24071 ,0.928696 ,
-0.156534 ,0.0742913 ,-0.0399168 ,
0.0211828 ,-0.010442 ,0.00454365 ,
-0.00162727 ,0.000413751 , /* Taps for 2 pt. stage*/
/* h2 */
0.000179016 ,-0.000993991 ,0.00337102 ,
-0.00878887 ,0.0195179 ,-0.0391929 ,
0.0752002 ,-0.150922 ,0.434816 ,0.800622 ,
-0.195691 ,0.0947718 ,-0.0503655 ,
0.0261281 ,-0.012481 ,0.00520545 ,
-0.00175246 ,0.000398089 , /* Taps for 3 pt. stage*/
/* h3 */
0.000299804 ,-0.00148356 ,0.00468472 ,
-0.0116839 ,0.0251544 ,-0.0494323 ,
0.0938025 ,-0.190337 ,0.629002 ,0.629002 ,
-0.190337 ,0.0938025 ,-0.0494323 ,
0.0251544 ,-0.0116839 ,0.00468472 ,
-0.00148356,0.000299804 , /* Taps for 4 pt. stage*/
/* h4 */
0.000398089 ,-0.00175246 ,0.00520545 ,
-0.012481 ,0.0261281 ,-0.0503655 ,
0.0947718 ,-0.195691 ,0.800622 ,0.434816 ,
-0.150922 ,0.0752002 ,-0.0391929 ,
0.0195179 ,-0.00878887 ,0.00337102 ,
-0.000993991,0.000179016 ,
```

```
/* Taps for 5 pt. stage*/
/* h5 */
0.000413751 ,-0.00162727 ,0.00454365 ,
-0.010442 ,0.0211828 ,-0.0399168 ,
0.0742913 ,-0.156534 ,0.928696 ,0.24071 ,
-0.0912276 ,0.045421 ,-0.0231834 ,
0.0111744 ,-0.00480929 ,0.00172808 ,
-0.000456579 ,8.56598e-005 , /* Taps for 6 pt. stage*/
/* h6 */
0.000290436 ,-0.000988085 ,0.00251081 ,
-0.00535979 ,0.0102127 ,-0.0182279 ,
0.0324999 ,-0.0680094 ,0.997106 ,0.0676469 ,
-0.0257936 ,0.0119559 ,
-0.00547454 ,0.00226274 ,
-0.000769295 ,0.000176379 ,-4.11365e-006,
-0.00011426
};
```

The C language file "circtbl.c" which initializes the pilot suppression table coefficients is shown below:

```
const float pilot_table[]= {.707107,.707107,
-.707107, -.707107};
```

The file "ints.asm" which contains the ISR, _c_int08 written in C30 assembly language is shown below:

```
        .globl  _I, _Q, _x, _ptr_x, _ptr_y, _phase_X
        .globl  _mag_X, _port, _ports_init, _flags
        .globl  _octant, _count, _filt_bank, _sine, _cosine
        .globl  _h, _filtaddr, _dft_buf, _dft_flag
        .globl  _count_offset, _pilot_ptr, _free_run_count
        .globl  _c_int01, _c_int02, _c_int03, _c_int04
        .globl  _c_int05, _c_int06
        .globl  _c_int07, _c_int08, _c_int09, _c_int10
        .globl  _c_int11
_c_int01:
        RETI
_c_int02:
        RETI
_c_int03:
        RETI
_c_int04:
        RETI
_c_int05:
        RETI
_c_int06:
        RETI
_c_int07:
        RETI
;**********************************************
; This Interrupt Service Routine (ISR) is executed
; upon receiving a serial port 1 receiver interrupt.
; When an A/D conversion is performed the
; converted 16 bit data is sent serially, causing an
; interrupt to occur.
; The converted data is read from the serial receive
; register and converted to floating point value. The
; left and right output values are sent out
; through serial port 1. The DFT buffer is also filled
; with 128 sample values upon completion of the
; DFT by the executive loop. The pilot signal
; component is also subtracted from the incoming
; sample values. The routine then determines if it is
; time to update the left or right output. If so, it then
; performs the appropriate filtering and updates the
; appropriate channel. The ISR then returns to the
; executive loop.

_c_int08:
        PUSH    ST              ;save context
        PUSH    R0
        PUSHF   R0
        PUSH    R1
        PUSHF   R1
        PUSH    R2
        PUSHF   R2
        PUSH    AR0
        PUSH    AR1
        PUSH    RC
        PUSH    RS
        PUSH    RE
        PUSH    BK LDI     @CONST+0,AR0
        LDI     @left,R2        ;concatenate left and right
                                ;channels
        OR      @right,R2       ;into one 32 bit word
        LDI     *AR0,R0         ;read a/d channel
        ASH     16,R0           ;sign extend
        ASH     -16,R0
        FLOAT   R0              ;convert to float
        STI     R2,*--AR0(4)    ;transmit right and left
                                ;signals
        LDI     @_free_run_count,R1  ;increment free
                                     ;running counter
        ADDI    1,R1
        STI     R1,@_free_run_count ;**********************************************
        LDI     @_dft_flag,R2   ;check if DFT snapshot is
                                ;complete
        BNZD    L2              ;if not then delay branch
        LDI     @_count,R1      ;increment sample counter
        ADDI    1,R1
        STI     R1,@_count
;       BNZ     L2              ;branch here
```

```
        LDI   @_dft_buf,AR1
        STF   R0,*AR1++    ;store sample into DFT
                           ;buffer
        STI   AR1,@_dft_buf ;update DFT buffer
                           ;pointer
        TSTB  7fh,AR1      ;check if buffer is full
        BNZ   L2           ;if not then delay branch
        LDI   1,R2         ;set flag to indicate
                           ;buffer full
        STI   R2,@_dft_flag
        LDI   126,R2       ;reinitialize offset
                           ;counter
        STI   R2,@_count_offset
L2:
        LDI   18,BK  ;load size of filter buffer into reg.
        LDI   @_ptr_y,AR1  ;store sample into filter ;
                           buffer
        STF   R0,*AR1++%
        STI   AR1,@_ptr_y  ;update filter buffer
                           ;pointer ADDI  @_octant,R1  ;R1= 1,5,9,13,etc. for left
                           ;channel
                           ;R1= 3,7,11,15,etc. for ;
                           right channel
                           ;R1 bit1 bit0
                           ;  0   1   for left
                           ;channel
                           ;  1   1   for right
                           ;channel TSTB  1,R1         ;check if R1 is odd
                           ;if not then do not filter
                           ;signal
        BZD   L20          ;delay branch
        LDI   @_count_offset,R0
                           ;increment offset
                           ;counter
        ADDI  1,R0
        STI   R0,@_count_offset
;       BZ    L20          ;branch here ;*********************************************
; Filter kernel
        LDI   @_filtaddr,AR0 ;initialize filter coeff. ptr.
        MPYF  *AR1++%,*AR0++,R0 ;do sum of 18
                                ;products.
     || SUBF R2,R2 ;initialize accumulator reg.
        RPTS  16
        MPYF  *AR1++%,*AR0++,R0 ;products of
                                ; last 18 samples
     || ADDF R0,R2,R2 ;multiplied by the associated
        ADDF  R0,R2,R2 ;filter coefficients
```

```
;*********************************************
        LDI   4,BK         ;cancel pilot signal using
                           ;circular sine table
        LDI   @_pilot_ptr,AR0
        NOP   *AR0++%
        LDF   @_mag_X,R0
        MPYF  *AR0,R0
        SUBF  R0,R2
;*********************************************
        TSTB  2,R1         ;check if R1= 1,5,9,etc
        BNZD  L6           ;if not then delay branch
        STI   AR0,@_pilot_ptr    ;save pilot pointer
        FIX   R2           ;convert output to integer
        AND   0ffffh,R2    ;clear upper 16 bits
;       B     L6           ;branch here BD    L20          ;delay branch
        NOP
        LSH   16,R2        ;put into upper 16 bits
        STI   R2,@left     ;left gets filtered output
;       B     L20          ;branch here
L6:
        STI   R2,@right    ;right gets filtered output L20:
        POP   BK           ;restore context
        POP   RE
        POP   RS
        POP   RC
        POP   AR1
        POP   AR0
        POPF  R2
        POP   R2
        POPF  R1
        POP   R1
        POPF  R0
        POP   R0
        POP   ST
        RETI
_c_int09:
        RETI
_c_int10:
        RETI
_c_int11:
        RETI

* DEFINE CONSTANTS *
        .bss   left,1
        .bss   right,1
        .bss   CONST,1
        .sect  ".cinit"
        .word  1,CONST
        .word  80805ch      ;0
        .end
```

The header files "fmdecode.h", "defs.h", and "ports.h", the vectors assembly language file "vectors.asm", and the link command file "fm.cmd" are shown below:

```c
/* File name:   fmdecode.h */
extern float I;  /* Real and imag parts of pilot signal*/
extern float Q;
/* Circular buffer for last 18 samples */
extern float y[18];
/* DFT Buffer N signal samples) */
extern float x[N], *ptr_x, *ptr_y, *dft_buf;
extern const float *pilot_ptr, *pilot_start;
extern float phase_X;  /* phase angle of pilot signal */
extern float mag_X;    /* magnitude of pilot signal */
extern float sector;   /*sector of circle range is [0,55] */
extern volatile unsigned int *port, free_run_count;
extern volatile unsigned int count_offset, dft_flag;
extern void ports_init();
extern int
octant,filt_bank,filtaddr,octant_main,filtaddr_main;
extern unsigned int count;
extern const float sine[];
extern const float cosine[];
extern const float pilot_table[];
extern const float h[7][18];

/* File name:   defs.h */
#define N 128      /* number of input signal samples stored */
#define NN 2*N
#define TRUE 1
#define FALSE 0
#define XTAL 30400000    /* C30 clock frequency in MHz */
#define PI 3.14159265358979323846
#define SAMPLE_RATE 152000 /* sample rate of FM composite signal */
#define TCLK1_PER XTAL/(4*SAMPLE_RATE)
#define XRATE 40*SAMPLE_RATE/2
#define RRATE 24*SAMPLE_RATE
#define TRANSMIT_RATE  XTAL/(4*XRATE)-1
#define RECEIVE_RATE  (XTAL/(4*RRATE)-1)*65536
#define SER_CLK_RATES  (TRANSMIT_RATE | RECEIVE_RATE)
#define idle() asm("\tIDLE")
#define A_D_FULL_SCALE 5.5
#define A_D_RES 65536
#define A_D_STEP 8.3923e-5
#define PHASE_RES 45.0/7.0  /* approx 6.4 degs.*/
#define INTERP 7
#define BIT0 1
#define BIT1 2
#define BIT2 4
#define BIT3 8
#define BIT4 16
#define BIT5 32
#define BIT6 64
#define BIT7 128
#define BIT8 256
#define BIT9 512
#define BIT10 1024
#define BIT11 2048
#define BIT12 4096
#define BIT13 8192
#define BIT14 16384
#define BIT15 32768
#define BIT16 65536
#define BIT17 131072
#define BIT18 262144
#define BIT19 524288
#define BIT20 1048576
#define BIT21 2097152
#define BIT22 4194304
#define BIT23 8388608
#define BIT24 16777216
#define BIT25 33554432
#define BIT26 67108864
#define BIT27 134217728
#define BIT28 268435456
#define BIT29 536870912
#define BIT30 1073741824
define BIT31 2147483648 define NBIT0 ~BIT0
define NBIT1 ~BIT1
#define NBIT2 ~BIT2
#define NBIT3 ~BIT3
#define NBIT4 ~BIT4
#define NBIT5 ~BIT5
#define NBIT6 ~BIT6
#define NBIT7 ~BIT7
#define NBIT8 ~BIT8
#define NBIT9 ~BIT9
#define NBIT10 ~BIT10
#define NBIT11 ~BIT11
#define NBIT12 ~BIT12
#define NBIT13 ~BIT13
#define NBIT14 ~BIT14
#define NBIT15 ~BIT15
#define NBIT16 ~BIT16
#define NBIT17 ~BIT17
#define NBIT18 ~BIT18
#define NBIT19 ~BIT19
#define NBIT20 ~BIT20
#define NBIT21 ~BIT21
#define NBIT22 ~BIT22
#define NBIT23 ~BIT23
#define NBIT24 ~BIT24
```

```
#define NBIT25  ~BIT25
#define NBIT26  ~BIT26
#define NBIT27  ~BIT27
#define NBIT28  ~BIT28
#define NBIT29  ~BIT29
#define NBIT30  ~BIT30
define NBIT31  ~BIT31 define restore_IE   asm("    pop IE      ;restore IE");
define ints_off     asm("    push IE     ;save IE");\
             asm("    ldi 0,IE    ;disable interrupts");\
             asm("    nop         ;interrupt in pipe?");\
             asm("    nop         ;interrupt in pipe?");

#define gie_clear()  asm("; begin of gie_clear()");\
             ints_off\
             asm("    and 0dfffh,ST  ;gie_clear");\
             restore_IE\
             asm("; end of gie_clear()")

#define gie_set()    asm("; begin of gie_set()");\
             ints_off\
             asm("    or 02000h,ST  ;gie_set");\
             restore_IE\
             asm("; end of gie_set()")

/* File name:   ports.h */
/* Primary bus control port */
    #define PRIM_BUS_CTL        0x0808064
    #define SWW0        BIT3
    #define SWW1        BIT4
    #define WTCNT0      BIT5
    #define WTCNT1      BIT6
    #define WTCNT2      BIT7

/* Serial port 1 */
#define     SERIAL_GLOB_CTL1 0x0808050
    #define RRDY        BIT0
    #define XRDY        BIT1
    #define FSXOUT      BIT2
    #define XSREMPTY    BIT3
    #define RSRFULL     BIT4
    #define HS          BIT5
    #define XCLKSRCE    BIT6
    #define RCLKSRCE    BIT7
    #define XVAREN      BIT8
    #define RVAREN      BIT9
    #define XFSM        BIT10
    #define RFSM        BIT11 define CLKXP       BIT12
    #define CLKRP       BIT13
    #define DXP         BIT14
    #define DRP         BIT15
    #define FSXP        BIT16
    #define FSRP        BIT17
    #define XLEN0       BIT18
    #define XLEN1       BIT19
    #define RLEN0       BIT20
    #define RLEN1       BIT21
    #define XTINT       BIT22
    #define XINT        BIT23
    #define RTINT       BIT24
    #define RINT        BIT25
    #define XRESET      BIT26
    #define RRESET      BIT27
#define SERIAL_XMIT_CTL1    0x0808052
    #define CLKXFUNC    BIT0
    #define CLKXIO      BIT1
    #define CLKXDATOUT  BIT2
    #define CLKXDATIN   BIT3
    #define DXFUNC      BIT4
    #define DXIO        BIT5
    #define DXDATOUT    BIT6
    #define DXDATIN     BIT7
    #define FSXFUNC     BIT8
    #define FSXIO       BIT9
    #define FSXDATOUT   BIT10
    #define FSXDATIN    BIT11
#define SERIAL_RCVE_CTL1    0x0808053
    #define CLKRFUNC    BIT0
    #define CLKRIO      BIT1
    #define CLKRDATOUT  BIT2
    #define CLKRDATIN   BIT3
    #define DRFUNC      BIT4
    #define DRIO        BIT5
    #define DRDATOUT    BIT6
    #define DRDATIN     BIT7
    #define FSRFUNC     BIT8
    #define FSRIO       BIT9
    #define FSRDATOUT   BIT10
    #define FSRDATIN    BIT11
#define SERIAL_TIMR_CTL1    0x0808054
    #define XGO         BIT0
    #define XHLD        BIT1
    #define XCP         BIT2
    #define XCLKSRC     BIT3
    #define XTSTAT      BIT5
    #define RGO         BIT6
    #define RHLD        BIT7
    #define RCP         BIT8
    #define RCLKSRC     BIT9
    #define RTSTAT      BIT11 define SERIAL_TIMR_CNT1    0x0808055
```

```
#define SERIAL_TIMR_PER1    0x0808056
#define SERIAL_DATA_XMT1    0x0808058
define SERIAL_DATA_RCV1    0x080805C /* Serial port 0 */
define SERIAL_GLOB_CTL0    0x0808040
#define SERIAL_XMIT_CTL0    0x0808042
#define SERIAL_RCVE_CTL0    0x0808043
#define SERIAL_TIMR_CTL0    0x0808044
#define SERIAL_TIMR_CNT0    0x0808045
#define SERIAL_TIMR_PER0    0x0808046
#define SERIAL_DATA_XMT0    0x0808048
define SERIAL_DATA_RCV0    0x080804C /* Timer 1 */
define TIMR_GLOB_CTL1      0x0808030
#define FUNC        BIT0
#define IO          BIT1
#define DATOUT      BIT2
#define DATIN       BIT3
#define GO          BIT6
#define HLD         BIT7
#define CP          BIT8
#define CLKSRC      BIT9
#define INV         BIT10
#define TSTAT       BIT11
#define TIMR_CNT1           0x0808034
#define TIMR_PER1           0x0808038

/* Timer 0 */
#define TIMR_GLOB_CTL0      0x0808020
#define TIMR_CNT0           0x0808024
#define TIMR_PER0           0x0808028

/* DMA Controller */
#define DMA_GLOB_CTL        0x0808000
#define DMA_SORC_ADDR       0x0808004
#define DMA_DEST_ADDR       0x0808006
#define DMA_XFR_CNTR        0x0808008
```

```
; File Name: vectors.asm
      .global RESET,INT0,INT1,INT2,INT3
      .global
XINT0,RINT0,XINT1,RINT1,TINT0,TINT1,DINT
      .global
_c_int00,_c_int01,_c_int02,_c_int03,_c_int04
      .global _c_int05,_c_int06,_c_int07,_c_int08
      .global _c_int09,_c_int10,_c_int11
;
      .sect "vectors" ; Linker to locate at address 0
RESET   .word  _c_int00   ; RESET- vector
INT0    .word  _c_int01   ; INT0- vector
INT1    .word  _c_int02   ; INT1- vector
INT2    .word  _c_int03   ; INT2- vector
INT3    .word  _c_int04   ; INT3- vector
XINT0   .word  _c_int05   ; Serial port 0 XMT
RINT0   .word  _c_int06   ; Serial port 0 RCV
XINT1   .word  _c_int07   ; Serial port 1 XMT
RINT1   .word  _c_int08   ; Serial port 1 RCV
TINT0   .word  _c_int09   ; Timer 0 vector
TINT1   .word  _c_int10   ; Timer 1 vector
DINT    .word  _c_int11   ; DMA vector
     .space 20            ; Reserved space
     .space 32            ; Trap vector locations
     .end
```

```
/* File name:   fm.cmd */
-c      /* LINK USING C CONVENTIONS    */
-o fm.out
-m fm.map
circtbl.obj
globals.obj
fmdecode.obj
funcs.obj
ints.obj
vectors.obj
-i f:\dspfloat  /* DIRECTORY FOR LIBRARIES */
-l rts30r.lib   /* GET RUN-TIME SUPPORT (USE
REGISTER MODEL LIBRARY) */
/* SPECIFY THE SYSTEM MEMORY MAP */

MEMORY
{
  VECS:  org = 0          len = 0x40
  ROM:   org = 0x40       len = 0xfc0
  RAM0:  org = 0x809800   len = 0x400    /* RAM
BLOCK 0 */
  RAM1:  org = 0x809c00   len = 0x1400   /* RAM
BLOCK 1, PLUS 4K OF EXT */
}

/* SPECIFY THE SECTIONS ALLOCATION INTO
MEMORY */

SECTIONS
{
  vectors: {} > VECS   /* INTERRUPT VECTOR
TABLE */
  .text:   {} > ROM    /* CODE */
  .cinit:  {} > ROM    /* INITIALIZATION
TABLES        */
  .data:   {} > ROM         /* INITIALIZED
DATA */
  .stack:  {} > RAM0        /* SYSTEM STACK
*/
  .bss:    {} > RAM1        /* GLOBAL &
STATIC VARS */
  filt_buf align(32): {} >RAM1    /* circular buf
aligned on 32 words */
``` dft_buff align(128): {} >RAM1  /* DFT buffer aligned on 128 words   */
}

V. Conclusion

This paper has presented a unique digital approach for decoding an FM stereo composite signal using a TMS320C30 floating point DSP. This approach becomes especially attractive to use with audio entertainment systems that feature multiple audio signal sources that can also be digitally decoded or enhanced. The DSP can also be used for frequency equalization and sound field enhancements on other digital signal sources such as compact disk (CD), digital compact cassette (DCC), or digital audio reception. Digital audio reception is a means of receiving audio signals that are broadcast digitally via satellite, cable or terrestrial transmitters. Development efforts are currently underway on digital audio radio (DAR) and digital audio broadcast (DAB). DAB will be capable of delivering CD quality sound to radio listeners. The TMS320C31 which is a lower cost version of the C30 may be employed today in radios which offer any or all of the above features to provide more flexibilty and to help reduce overall system cost. As the TMS320C3x family continues to grow, lower cost C3x derivatives with audio specific peripherals will become available.

References:

[1] Patent #TI-16093, Devices, Systems, and Methods for Composite Signal Decoding, 1991.
[2] Texas Instruments, TMS320C3x User's Guide, 1991
[3] Texas Instruments, TMS320 Floating-Point DSP Optimizing C Compiler User's Guide, 1991
[4] Texas Instruments, TMS320 Floating-Point Assembly Language Tools User's Guide, 1991
[5] Texas Instuments, TMS320C3x C Source Debugger User's Guide, 1991
[6] Texas Instruments, TMS320C30 EVM Technical Reference, 1991
[7] Burr Brown, DEM-DSP102/202, Electrical Schematics of Analog I/O Board, 1991
[8] Momentum Data Systems, Filter Design and Analysis System, Version 1.1, 1991
[9] Proakis and Manolakis, Introduction to Digital Signal Processing, 1988.
[10] The MathWorks Inc., MATLAB

What is claimed is:

1. A decoder for decoding a composite signal sampled during a sample interval at a pre-determined sample rate; said composite signal synchronized with a pilot signal; said decoder including a filter for filtering selected portions of said composite signal;

said filter including filter coefficients for operating on said composite signal;

means for developing said filter coefficients as a function of said pilot signal;

an interpolator filter for constructively determining a value of said composite signal in said sample interval and at such instances as the phase of said pilot signal obtains an integral multiple of a pre-determined phase angle; and said sample interval of said pre-determined sample rate being asynchronous to said pilot signal.

2. A decoder as in claim 1, said pre-determined phase angle comprising an integral multiple of a 45° angle.

3. A decoder as in claim 2, wherein said composite signal includes two channels, said decoder including upsample means for upsampling said composite signal by an interpolation factor;

said interpolation factor being a function of a pre-selected channel separation (($\tau$) in dB) between said selected two channels of said composite signal.

4. A decoder as in claim 3, said pre-selected channel separation comprising a −30 dB channel separation.

5. A decoder as in claim 3, said upsample means including means for inserting a pre-determined number of zeros between samples of said composite signal;

said pre-determined number of zeros being a function of said interpolation factor.

6. A decoder as in claim 3, said interpolation factor being determined according to the following algorithms:

$$\frac{\phi}{360°} \cdot \frac{1}{f_c} = \frac{1}{f_{es}}$$

where $f_c$=carrier rate $f_{es}$=effective sample rate;

$\phi$ being determined according to the expression:

$1-\sin(90°+\phi)=10^{-\tau/20}$; and $U=\text{int}(f_{es}/F_s)$ where $\tau$=channel separation in decibels;

U=interpolation factor;

$F_s$=sample rate; and int()=round-up operator to integer value.

7. A decoder as in claim 6, said filter including a passband corresponding to the bandwidth of said composite signal; said filter being a function of said pre-determined sample rate.

8. A decoder as in claim 6, said filter for filtering 2 said composite signal according to the expression:

$$y(n) = \sum_{l=0}^{M-1} fm_u(n-l)h(l)$$

where $fm_u(k)=fm(k/U)$, k=0,U, 2U, . . . 0, all other cases fm=discrete composite signal;

h=filter coefficients;

M=number of coefficients require to meet a pre-determined passband cutoff frequency, stopband cutoff frequency, and stopband attenuation.

9. A decoder as in claim 3, said decoder including a multiplier for multiplying said filter coefficients by said interpolator factor.

10. A decoder as in claim 3, said filter including a sequence of sub-filters, said sub-filters comprising a pre-determined number of banks of said filter coefficients;

said pre-determined number of banks being a function of said interpolation factor;

each said sub-filter corresponding to a respective pre-determined offset from said pre-determined phase angle.

11. A decoder as in claim 10, wherein:

a selected sub-filter of said sub-filters filters a given sample of said composite signal;

said selected sub-filter being selected by having a corresponding said pre-determined offset with an offset of the phase of a sampled pilot signal within a selected sample of said composite signal from said pre-determined phase angle.

12. A decoder as in claim 10, each said sub-filter for filtering said composite signal according to the expression:

$$y(n) = \sum_{l=0}^{L-1} fm(n-l)h_k(l)$$

where $h_k(l)=h(k+Ul).U$;

k=0, 1, 2, . . . U−1;

L=M/U;

U=interpolation factor; and

L=number of filter coefficients within each said bank.

13. A decoder as in claim 1, said decoder including an A/D converter for converting an incoming analog signal into a digital signal; said incoming analog signal including said composite signal;

a D/A converter for converting said selected portions of said composite signal into respective analog output signals.

14. A decoder as in claim 13, said decoder including a low pass filter for filtering said analog output signals.

15. A decoder as in claim 1, said decoder including a discrete transformer for providing a result of an N-point transformation of a discrete signal at a frequency of said pilot signal to said pilot phase calculator.

16. A decoder as in claim 15, said discrete transformer including an N-point transform for operating on said sample.

17. A decoder as in claim 16, said transform comprising a discrete Fourier transform.

18. A decoder as in claim 17, said transform comprising a fast Fourier transform.

19. A decoder as in claim 15, said result comprising a first and second complex component of said pilot signal.

20. A decoder as in claim 19, said pilot phase calculator for determining said phase angle according to the equations $$\phi' = \arctan(Q/I)$$

where $\phi'$=calculated said phase angle of the pilot signal;
Q=said first complex component; and
I=said second complex component.

21. A decoder comprising a polyphase filter for obtaining a filtered output signal from a sample of an input composite signal, said polyphase filter comprising a plurality of sub-filters; said sample including a pilot signal; each of said sub-filters being associated with a pre-determined offset from a reference pilot phase angle;

a pilot phase calculator for determining a phase angle of said pilot signal;

a filter bank selector for selecting one of said sub-filters for filtering said sample, said pre-determined offset of the one corresponding to an offset of said phase angle; and a channel selector for selecting a first and second channel signal from said filtered output signal.

22. A decoder as in claim 21, said decoder including a pilot signal suppressor for removing said pilot signal from said sample or said filtered output signal with a pilot suppression signal.

23. A decoder as in claim 22, said pilot signal suppressor including a pilot magnitude calculator;
a sine table means for providing a trigonometric sine value; and
a multiplier;

said pilot magnitude calculator for determining a magnitude of said pilot signal according to the equation $$A_p' = (2/N) \times \sqrt{I^2 + Q^2}$$

where $A_p'$=calculated said magnitude of the pilot signal;
I=said first complex component; and
Q=said second complex component;

said multiplier for multiplying said magnitude to said sine value and developing said pilot suppression signal.

24. A decoder as in claim 23, said pilot signal suppressor including a subtractor for subtracting said pilot suppression signal from said filtered output signal or said sample.

25. A decoder as in claim 21, said decoder including a serially connected digital-to-analog converter and low pass filter for operating on said first and second channel signals and developing an output analog signal.

26. A decoder as in claim 21, said polyphase filter for filtering said sample according to the equation $$y(n) = \sum_{l=0}^{L-1} fm(n-l)h_k(l)$$

where k=0, 1, 2, . . . U−1;
l=0, 1, 2, . . . L−1;
y(n)=said filtered output;
L=M/U where
U=interpolation factor and
M=length of interpolator filter h(n);
fm(n−l)=(n−l)$^{th}$ discrete signal of said sample; and
$h_k(l)$= an l$^{th}$ term of a sequence of filter coefficients in the k$^{th}$ filter bank.

27. A decoder as in claim 21, said decoder comprising a digital signal processor (DSP) for receiving said sample and outputting said first and second channel signals.

28. A decoder as in claim 27, said decoder including an analog-to-digital (A/D) converter for converting said input signal to a digital signal;

a digital-to-analog (D/A) converter for converting said first and second channel signals to first and second analog signals; and a clock for synchronizing communication between said A/D, DSP, and D/A.

29. A decoder as in claim 28, said clock including a TTL clock for providing a first clock signal to said A/D;
a DIVIDE BY N clock for providing a DIVIDE BY N clock signal to said D/A;
a DIVIDE BY 2 clock for providing a DIVIDE BY 2 clock signal to said A/D, DSP, and D/A; and
a second clock for providing a second clock signal to said DSP.

30. A decoder as in claim 28, said decoder including an adjustable gain pre-amp for boosting gain of an incoming analog signal and delivering an amplified input signal to said A/D.

31. A decoder as in claim 28, said decoder including a first and second channel output; and
a pair of low pass filters respectively connecting to said channel outputs.

32. A signal receiver system including an antenna for receiving an input composite signal;
an amplifier for amplifying said input composite signal; and
a decoder for decoding a composite signal sampled during a sample interval at a pre-determined sample rate; said composite signal synchronized with a pilot signal; said decoder including a filter for filtering selected portions of said composite signal;

said filter including filter coefficients for operating on said composite signal;

means for determining said filter coefficients as a function of said pilot signal;

an interpolator filter for constructively determining a value of said composite signal in said sample interval and at such instances as the phase of said pilot signal obtains an integral multiple of a pre-determined phase angle; and said sample interval of said pre-determined sample rate being asynchronous to said pilot signal.

33. A signal receiver system as in claim 32, said decoder including upsample means for upsampling said composite signal by an interpolation factor;

said interpolation factor being a function of a pre-selected channel separation (($\tau$) in dB) between said selected portions of said composite signal.

34. A signal receiver system as in claim 33, said filter including a plurality of sub-filters, said sub-filters comprising a pre-determined number of banks of said filter coefficients;

said pre-determined number of banks being a function of said interpolation factor;

each said sub-filter corresponding to a respective pre-determined offset from said pre-determined phase angle.

35. A signal receiver system as in claim 34, a selected sub-filter of said sub-filters for filtering a given sample of said composite signal;

said pre-determined offset of said selected sub-filter corresponding to an offset of the phase of said pilot signal within a selected sample of said composite signal from said pre-determined phase angle.

36. A signal receiver system as in claim 32, said decoder including a pilot signal suppressor for removing said pilot signal from said composite signal, said pilot signal suppressor including a pilot magnitude calculator for determining a magnitude of said pilot signal in a sampled portion of said composite signal;

sine table means for providing a trigonometric sine value;

a multiplier for providing a pilot suppression signal from multiplying said magnitude and said sine value; and a subtractor for subtracting said pilot suppression signal from said sampled portion of the composite signal.

37. A signal receiver system as in claim 32, said decoder comprising a filter coefficient generator for providing said filter coefficients as a function of said pilot signal, said coefficient generator including;

a transformer for generating a frequency-dependent signal by transforming a sampled portion of said composite signal at the frequency of said pilot signal with a transform algorithm;

a pilot phase calculator for determining the phase of said pilot signal associated with said frequency-dependent signal; and a filter coefficient selector for providing said filter coefficients to said filter, said filter selector comprising a pre-determined number of banks of filter coefficients;

each of said banks of filter coefficients corresponding to a pre-determined offset from a reference pilot phase angle.

38. A signal receiver system as in claim 32, said signal receiver system including an analog-to-digital (A/D) converter for converting an incoming analog signal into a digital signal; said incoming analog signal including said composite signal;

a digital-to-analog D/A converter for converting said selected portions of said composite signal into respective analog output signals; and a low pass filter for filtering said analog output signals.

39. A method for decoding a composite signal with a decoder, said method including:

a) sampling said composite signal during a time interval and obtaining a sampled composite signal, said sampled composite signal including a pilot signal;

b) calculating a phase offset of said pilot signal from a reference pilot signal with a phase calculator;

c) filtering said sampled composite signal with an interpolation filter to obtain a constructive composite signal corresponding to said reference pilot signal; and, d) selecting portions of said constructive composite signal with a channel selector.

40. A method as in claim 39, step (c) including i) determining a plurality of sets of filtered coefficients as a function of phase offset from said reference pilot signal; and ii) selecting a set of filter coefficients based upon said phase offset.

41. A method as in claim 39, said method including prior to step (a), discretizing said composite signal with a digital-to-analog converter; and after step (d), converting said portions to time-varying output signals with a digital-to-analog converter and filtering noise from said time-varying output signals using a filter.

42. A method as in claim 39, step (a) including obtaining discrete Fourier transform snapshots of a composite baseband signal sample;

step (b) including
i) calculating a discrete Fourier transform at a pilot frequency; and
ii) obtaining a pilot phase angle from said discrete Fourier transform snapshots;

step (c) including
using said pilot phase angle to select from a polyphase interpolation filter bank;

step (e) including
suppressing said pilot signal using magnitude information from said discrete Fourier transform snapshots.

43. A method for decoding a composite signal in a signal receiver system, said method including;

a) receiving said composite signal with an antenna;

b) amplifying said composite signal;

c) discretizing said composite signal with a digital-to-analog converter;

d) decoding said composite signal with a decoder, said decoding step including:
i) sampling said composite signal during a time interval and obtaining a sampled composite signal, said sampled composite signal including a pilot signal;
ii) calculating a phase offset of said pilot signal from a reference pilot signal with a phase calculator;
iii) filtering said sampled composite signal with an interpolation filter to obtain a constructive composite signal corresponding to said reference pilot signal; and,
iv) selecting portions of said constructive composite signal with a channel selector;

e) converting said portions to time-varying output signals with a digital-to-analog converter; and, f) filtering noise from said time-varying output signals using a filter.

44. A decoder for decoding a composite signal sampled during a sample interval at a pre-determined sample rate; said composite signal synchronized with a pilot signal; said decoder including a filter for filtering selected portions of said composite signal;

said filter including filter coefficients for operating on said composite signal;

means for developing said filter coefficients as a function of said pilot signal;

a pilot signal suppressor for removing said pilot signal from said composite signal, said pilot signal suppressor including;

a pilot magnitude calculator for determining a value of said pilot signal in a sampled portion of said composite signal;

a subtractor for subtracting said value of the pilot signal from said sampled portion of the composite signal; and said sample interval of said pre-determined sample rate being asynchronous to said pilot signal.

45. A decoder as in claim 44, said pilot signal suppressor including sine table means for providing a trigonometric sine value; and a multiplier;

said pilot magnitude calculator for determining a magnitude of said pilot signal;

said multiplier for multiplying said magnitude and said sine value.

46. A decoder for decoding a composite signal sampled during a sample interval at a pre-determined sample rate; said composite signal synchronized with a pilot signal; said decoder including a filter for filtering selected portions of said composite signal;

said filter including filter coefficients for operating on said composite signal;

means for developing said filter coefficients as a function of said pilot signal;

a filter coefficient generator for generating said filter coefficients as a function of said pilot signal, said filter coefficient generator including:

a transformer for generating a frequency-dependent signal by transforming a sampled portion of said composite signal at the frequency of said pilot signal with a transform algorithm, a pilot phase calculator for determining the phase of said pilot signal associated with said frequency-dependent signal, and a filter coefficient selector for developing said filter coefficients as a function of the phase of said pilot signal and for providing said filter coefficients to said filter; and said sample interval of said pre-determined sample rate being asynchronous to said pilot signal.

47. A decoder as in claim 46, said filter selector comprising a pre-determined number of banks of filter coefficients;

each of said banks of filter coefficients corresponding to a pre-determined offset from a reference pilot phase angle.

* * * * *